United States Patent
Lee

(10) Patent No.: US 9,630,252 B2
(45) Date of Patent: Apr. 25, 2017

(54) PORTABLE PIPE OUTER DIAMETER-CHAMFERING APPARATUS WITH IMPROVED WELDABILITY

(71) Applicant: Jong Il Lee, Daejeon (KR)

(72) Inventor: Jong Il Lee, Daejeon (KR)

( * ) Notice: Subject to any disclaimer, the term of this patent is extended or adjusted under 35 U.S.C. 154(b) by 0 days.

(21) Appl. No.: 14/992,567

(22) Filed: Jan. 11, 2016

(65) Prior Publication Data
US 2016/0207114 A1 Jul. 21, 2016

(30) Foreign Application Priority Data
Jan. 15, 2015 (KR) .................. 10-2015-0007489

(51) Int. Cl.
*B23B 5/16* (2006.01)

(52) U.S. Cl.
CPC .......... *B23B 5/161* (2013.01); *B23B 2215/72* (2013.01); *B23B 2220/04* (2013.01); *B23B 2260/116* (2013.01)

(58) Field of Classification Search
CPC  B23C 3/007; B23C 3/122; B23C 1/20; B23C 2220/16; B23C 3/126; B23B 5/16; B23B 5/168
USPC .......................................................... 82/113
See application file for complete search history.

(56) References Cited

U.S. PATENT DOCUMENTS

| | | | | |
|---|---|---|---|---|
| 2,188,624 A * | 1/1940 | Dantry | ................... | B23B 5/167 408/211 |
| 8,297,157 B1 * | 10/2012 | Miller | ................... | B23C 3/007 408/211 |
| 8,740,521 B2 * | 6/2014 | Jeon | ................... | B23C 3/12 408/202 |
| 8,961,082 B2 * | 2/2015 | Jeon | ................... | B23C 3/122 144/136.95 |
| 9,498,825 B2 * | 11/2016 | Robeson | ................ | B08B 9/021 |

(Continued)

FOREIGN PATENT DOCUMENTS

| KR | 10-0899957 | 5/2009 |
|---|---|---|
| KR | 10-0988070 | 10/2010 |

(Continued)

OTHER PUBLICATIONS

English Translation of 10-0899957.
(Continued)

*Primary Examiner* — Sara Addisu
(74) *Attorney, Agent, or Firm* — KORUS Patent, LLC; Seong Il Jeong

(57) ABSTRACT

The present invention relates to a portable pipe outer diameter-chamfering apparatus characterized in that a vertical fixing plate is fixed to the outside of the vertical plate, a horizontal fixing plate is fixed in an orthogonal direction to the tip of the vertical fixing plate, a rectangular link with one open side is coupled to move upward and downward along the vertical fixing plate, a pair of circumscribing rollers, each of the pair of circumscribing rollers being installed on either end portion of the rectangular link with one open side, respectively, the rectangular link with one open side moves up and down along the vertical fixing plate, a moving body is installed in the horizontal fixing plate, the moving body moves up and down, and an inscribing roller which is in close contact with an inside of the pipe is installed on the moving body.

4 Claims, 5 Drawing Sheets

(56) References Cited

U.S. PATENT DOCUMENTS

| | | | | |
|---|---|---|---|---|
| 2009/0235532 A1* | 9/2009 | Stratford-Smith | ...... | B23C 3/122 30/102 |
| 2012/0067190 A1* | 3/2012 | Tseng | ...................... | B23C 3/122 83/869 |
| 2015/0258613 A1* | 9/2015 | Choi | ......................... | B23C 1/20 82/1.11 |
| 2015/0290757 A1* | 10/2015 | Rieth | ....................... | B23Q 9/02 409/179 |
| 2017/0021428 A1* | 1/2017 | Glaser | ..................... | B23B 5/168 |

FOREIGN PATENT DOCUMENTS

| KR | 10-1063951 | 9/2011 |
|---|---|---|
| KR | 10-2013-0107846 | 10/2013 |
| KR | 10-1340571 | 12/2013 |
| KR | 10-1416221 | 7/2014 |
| KR | 10-1458829 | 11/2014 |
| KR | 10-2014-0142513 | 12/2014 |

OTHER PUBLICATIONS

English Translation of 10-1063951.
English Translation of 10-1458829.
English Translation of 10-2013-0107846.
English Translation of 10-1416221.
English Translation of 10-0988070.
English Translation of 10-1340571.
English Translation of 10-2014-0142513.

* cited by examiner

PORTABLE PIPE OUTER DIAMETER-CHAMFERING APPARATUS WITH IMPROVED WELDABILITY

CROSS-REFERENCE TO RELATED APPLICATION(S)

This application claims the benefit of Korean Application No. 10-2015-0007489, filed on Jan. 15, 2015, with the Korean Intellectual Property Office, the disclosure of which is hereby incorporated by reference in its entirety.

BACKGROUND

1. Technical Field

The present invention relates to a portable pipe outer diameter-chamfering apparatus with improved weldability which chamfers the edge of a pipe to weld a cutting pipe, and more particularly a portable pipe chamfering apparatus capable of easily chamfering pipes with various diameters in a simple structure.

2. Description of the Related Art

For the welding of pipes, the cutting surfaces of the pipes have to be chamfered. However, the work of chamfering a cutting pipe at the bottom is performed by engaging pipes with a conventional chamfering apparatus and thus the work can be easily performed. However, the chamfering work on the cutting surface of pipes in which pipes have been already installed in the course of performing the piping work is very difficult.

That is, during the plant piping work, pipes with various diameters are placed in elevated places. Therefore, the pipe chamfering work using a tool such as a portable grinder does not provide a regular chamfered angle and is performed while rotating grinder along the cutting surface of the pipes. Therefore, the work is difficult and the work is performed at elevated places, the working environment thereby becomes poor.

In addition, when the chamfering work is performed by installing a portable automatic chamfering apparatus on the cutting surface of the pipes, a chamfering apparatus with various sizes is provided depending on the diameters of the pipes and then a chamfering apparatus suitable for the diameter of pipes must be selected and used. Thus, the work of chamfering the cutting surface of the pipes during the plant work using a pipe chamfering apparatus may be difficult.

That is, when a grinder with a free rotation and angle adjustment is used for the chamfering work on the cutting surface of the pipes, a regular chamfered angle is not guaranteed and the worker has to perform the work while rotating the grinder along the outer diameter of the pipe one by one. Therefore, the work efficiency decreases and the work may be dangerous.

Meanwhile, when the chamfering work on the cutting surface of the pipe is automatically performed, the chamfering apparatus must be replaced in compliance with the diameter of the pipe. Therefore, there are problems that several kinds of chamfering apparatuses must be provided in compliance with the diameter of the pipe, and such automatic chamfering apparatuses cannot be easily used to perform the work in elevated places.

PRIOR ART DOCUMENTS

Patent Publications (Patent Publication 0001) Korean Patent No. 10-1416221 (issued on Jul. 1, 2014)

(Patent Publication 0002) Korean Patent No. 10-0988070 (issued on Oct. 8, 2010)

(Patent Publication 0003) Korean Patent No. 10-1340571 (issued on Dec. 5, 2013)

(Patent Publication 0004) Korean Patent Publication No. 10-2014-0142513 (published on Dec. 12, 2014)

SUMMARY

The present invention relates to a portable pipe outer diameter-chamfering apparatus for chamfering a cutting surface of a pipe. An object of the present invention is to solve the problems that, when the work of chamfering the cutting surface of pipes located in an elevated place during the plant piping work is manually performed, the work efficiency decreases and the work may be difficult. Another object of the present invention is to solve the problems that, in the case of using the pipe chamfering apparatus, the work is easy and can be easily and conveniently performed, but several chamfering apparatuses must be provided in compliance with the diameter of the pipe.

The chamfering apparatus of the present invention can perform chamfering by actively installing in accordance with the diameter of the pipe, thereby the pipe chamfering can be easily performed.

According to the present invention, a vertical plate and a support plate are fixed in an orthogonal direction to a half-moon shaped chamfered angle adjustment plate fixed to either side of the head of the portable chamfering apparatus; a vertical fixing plate is fixed to the outside of the vertical plate, and a horizontal fixing plate is fixed in an orthogonal direction to the tip of the vertical fixing plate; a rectangular link with one open side is coupled to the vertical fixing plate, and a pair of circumscribing rollers for closely adhering to the outside of the pipe are installed on both end portions of the rectangular link with one open side; the rectangular link with one open side may move up and down by a circumscribing roller adjustment screw installed on the horizontal fixing plate; a moving body is installed in the lower side of the horizontal fixing plate, and the moving body may move up and down by an inscribing roller adjustment screw installed on the horizontal fixing plate; an inscribing roller in which a pressing power is adjusted by a spring and which is in close contact with the inside of the pipe is installed on the moving body; and the pipe is chamfered by a cutting blade by closely adhering the vertical plate and the support plate to the pipe section by adjusting the heights of the inscribing roller and the circumscribing rollers.

In the present invention, the circumscribing rollers and the inscribing roller rotate in only one direction by the use of one-way clutches, the inscribing roller maintains a state of being in close contact with the inside of the pipe due to the tension of the spring, and the circumscribing rollers may adjust the height and be closely adhered to the pipe regardless of the diameter of the pipe.

According to the present invention, the outer edge of the pipe section is chamfered by the rotation of the knife-blade installed to be protruded on the middle edge of the vertical plate and the support plate, and the chamfering apparatus performs the chamfering of pipe while rotating only in one direction which is a circumferential direction of the pipe by the one-way clutches installed in the inscribing roller and the circumscribing rollers.

The present invention provides a pipe outer diameter-chamfering apparatus for chamfering the cutting surface of the pipe for welding, wherein the chamfering is performed by moving the circumscribing rollers up and down regardless of the pipe diameter and closely adhering them to the outside of the pipe. Thus, the chamfering of the pipe is performed elaborately, while the chamfering can be performed regardless of the diameter of the pipe. Further, the chamfering is performed in one direction and thus the chamfering work may be convenient and safe. Especially, due to the simple structure and convenient portability, it is possible to conveniently perform the chamfering of the pipe during plant piping work performed in elevated places.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
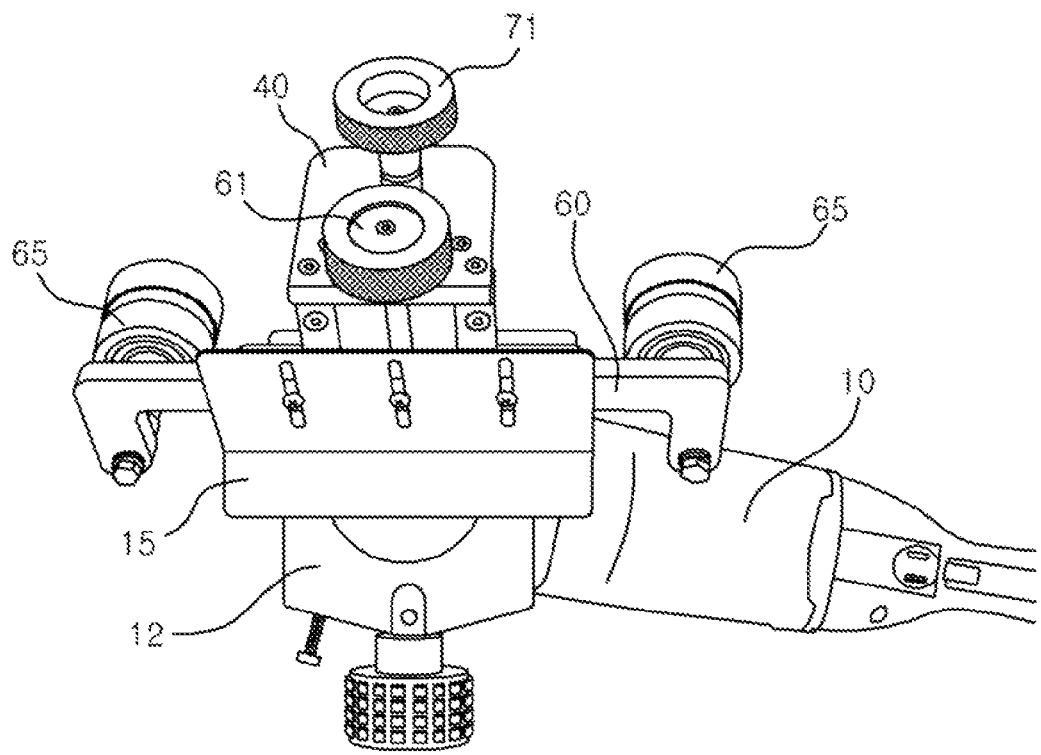
FIG. 1 is a front perspective view of the chamfering apparatus in accordance with the present invention.
Figure 2:
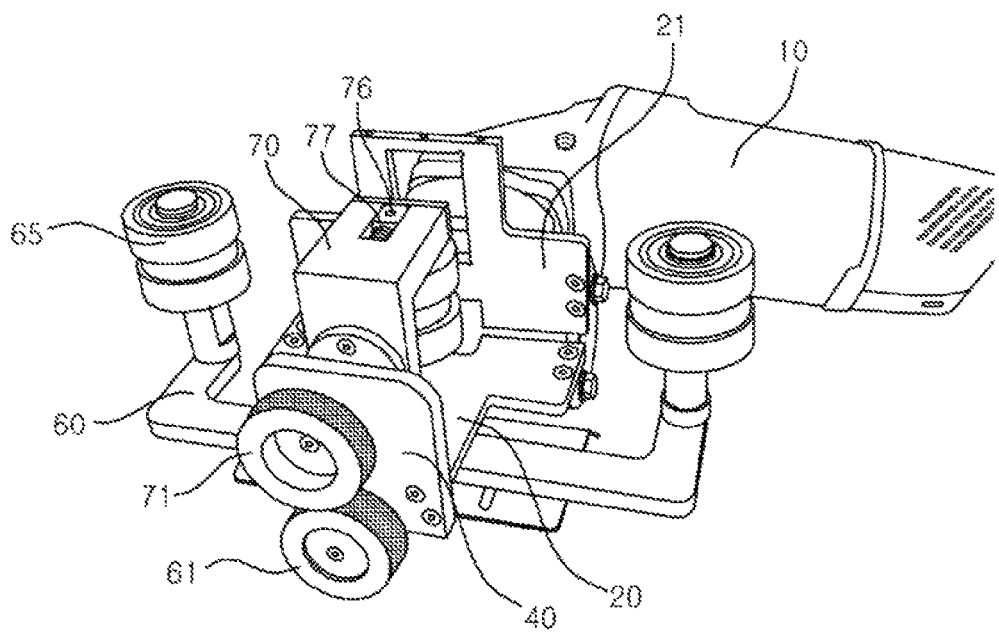
FIG. 2 is a rear perspective view of the chamfering apparatus in accordance with the present invention.
Figure 3:
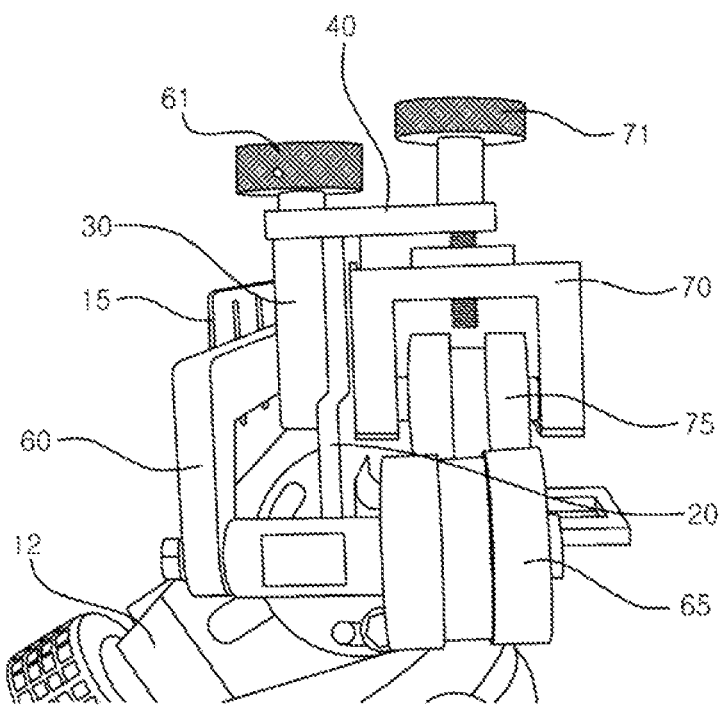
FIG. 3 is a side view of the chamfering apparatus in accordance with the present invention.
Figure 4:
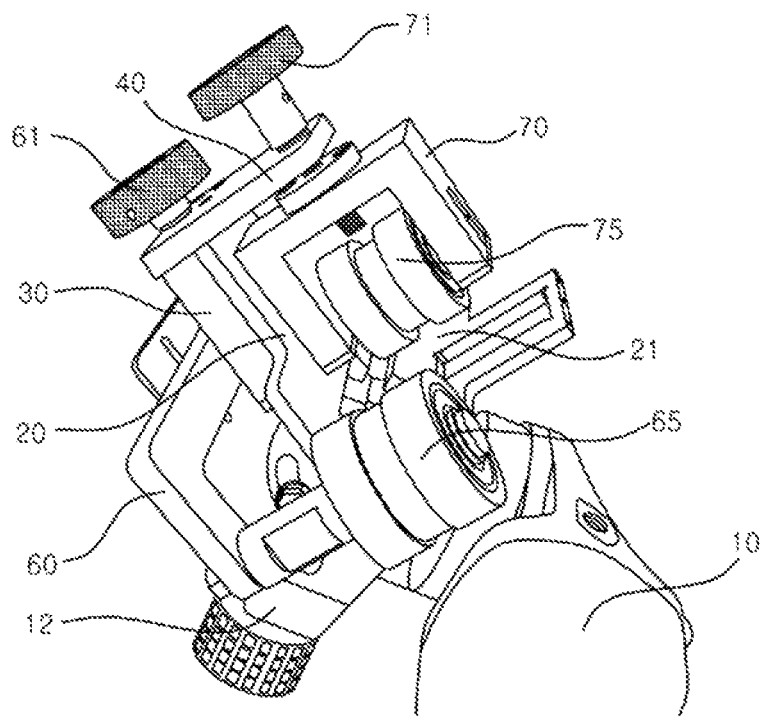
FIG. 4 is a side perspective view of the chamfering apparatus in accordance with the present invention.
Figure 5:
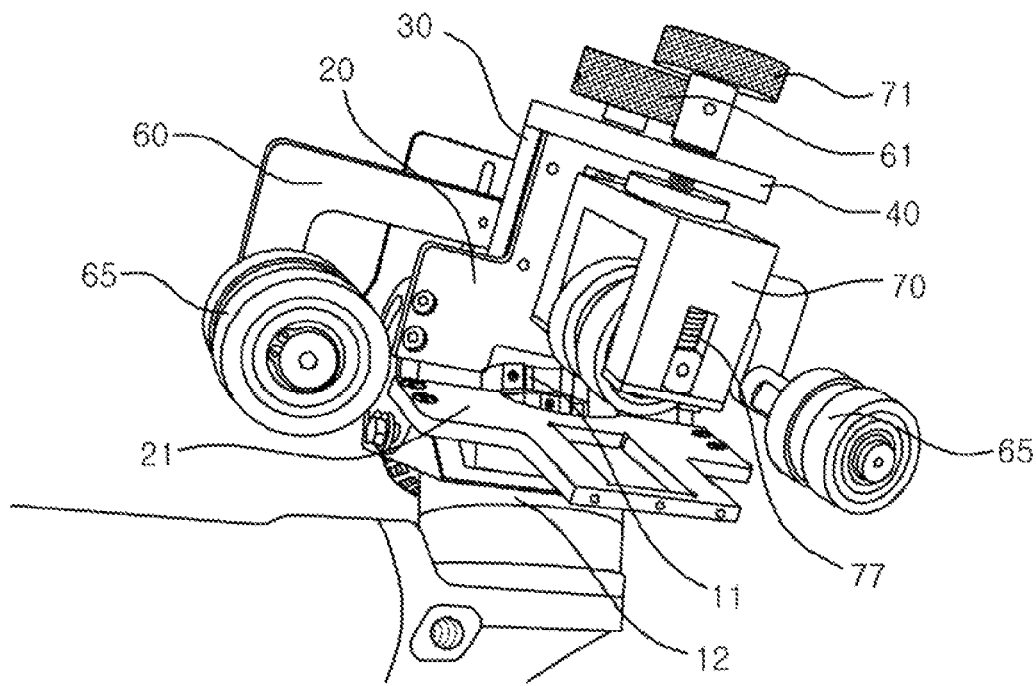
FIG. 5 is a main portion-perspective view of the chamfering apparatus in accordance with the present invention.
Figure 6:
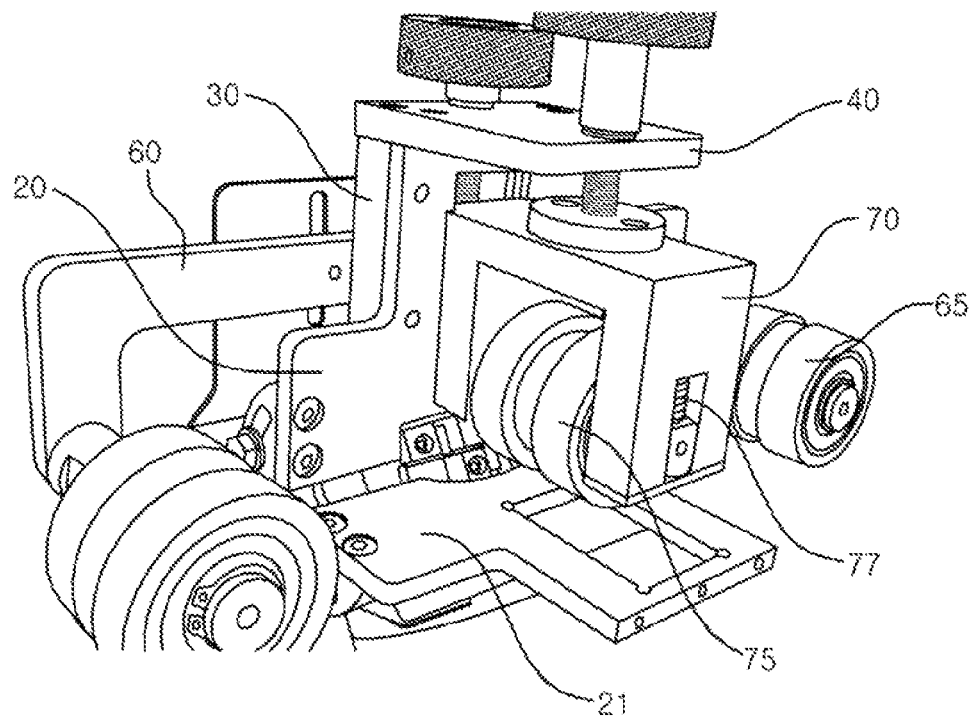
FIG. 6 is a main portion enlarged perspective view of the chamfering apparatus in accordance with the present invention.
Figure 7:
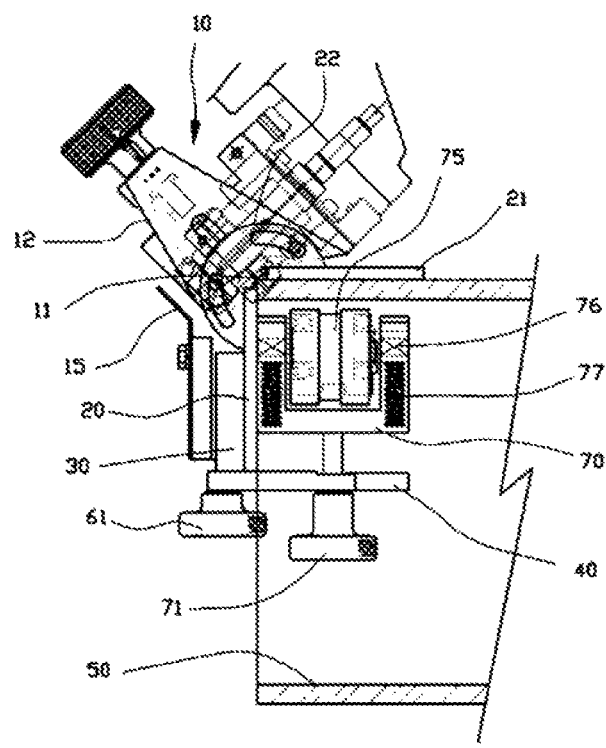
FIG. 7 is a cross-sectional view of the chamfering apparatus in accordance with the present invention during use.
Figure 8:
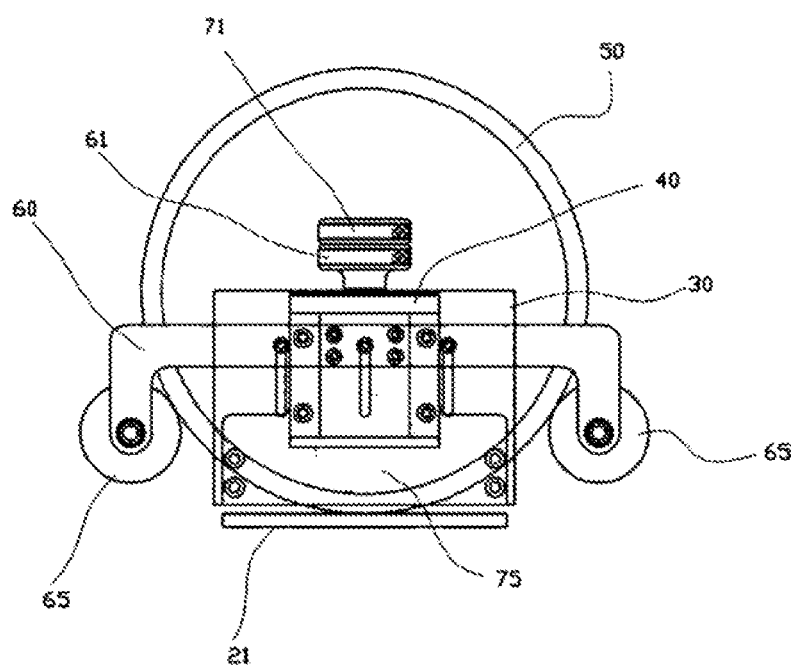
FIG. 8 is a side view of the chamfering apparatus in accordance with the present invention during use.
Figure 9:
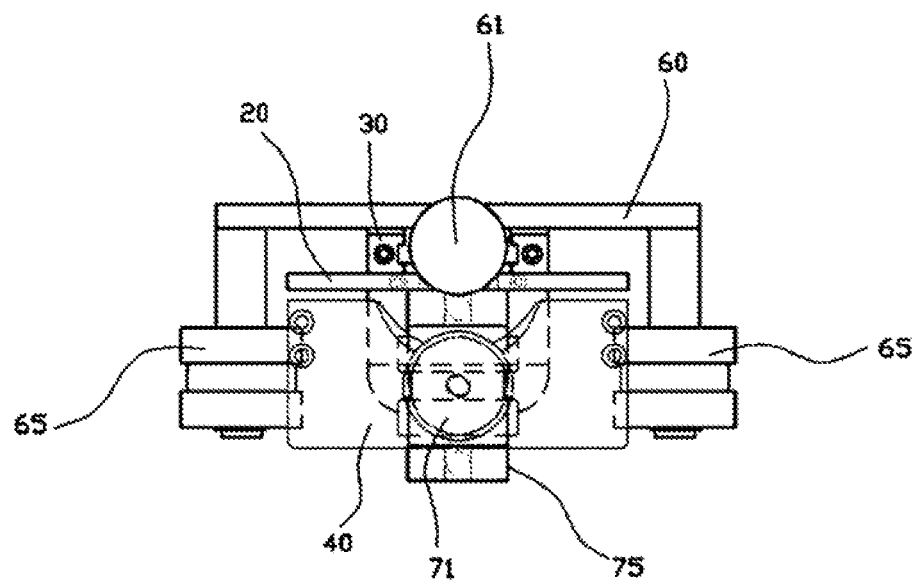
FIG. 9 is a plan view of the chamfering apparatus in accordance with the present invention.
Figure 10:
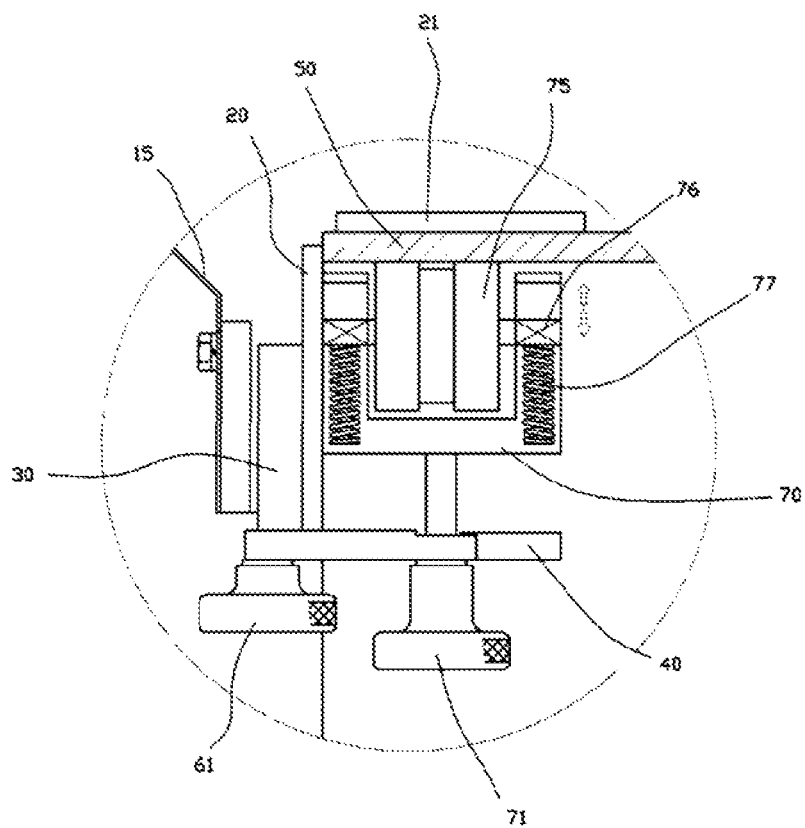
FIG. 10 is a cross-sectional view of a moving body of the chamfering apparatus in accordance with the present invention.

Hereinafter, the configuration and operation of preferred embodiments of the present invention will be described in detail with reference to the accompanying drawings. Here, in the case of assigning the reference numerals to the components of the drawings, it should be noted that, with respect to the same components, the same reference numerals are used even in different drawings.

The present invention relates to the use of a portable chamfering apparatus to a cutting surface of a pipe, wherein a vertical plate and a support plate are fixed in an orthogonal direction to a half-moon shaped chamfered angle adjustment plate fixed to either side of a head of the portable chamfering apparatus, and then the chamfering is performed by projecting a knife blade located between the vertical plate and the support plate. Herein, two circumscribing rollers are closely adhered to the outside of the pipe while one inscribing roller is closely adhered to the inside of the pipe, and the knife-blade projected between the vertical plate and the support plate is installed, thus chamfering the outside of the cutting surface of the pipe.

The circumscribing roller is adhered to the outside of the pipe regardless of the pipe diameter since their heights are adjusted in a state spaced from each other, the inscribing roller is adhered to the inside of the pipe and the adhesion is maintained by the tension of a spring, and the chamfering apparatus is fixed such that the chamfering surface of the pipe is placed between the vertical plate and the support plate.

A vertical fixing plate is fixed to the outside of the vertical plate, a horizontal fixing plate is installed in an orthogonal direction to the tip of the vertical fixing plate, the vertical fixing plate is installed in an orthogonal direction to the pipe length, and the horizontal plate is installed in a longitudinal direction from the tip of the pipe to the inside of the pipe.

The center of the rectangular link with one open side is coupled to the vertical fixing plate such that the circumscribing rollers coupled to the tips of the rectangular link with one open side are installed at the same distance from either side of the vertical fixing plate, and the rectangular link with one open side may move up and down by a circumscribing roller adjustment screw installed on the horizontal fixing plate. Since the rectangular link with one open side moves up and down on the basis of the center of the pipe, when the rectangular link with one open side goes to the center of the pipe, the pipe with less diameter may be chamfered, and when the rectangular link with one open side goes farther from the center of the pipe, the pipe with larger diameter may be chamfered.

The circumscribing rollers are adhered to the outside of the pipe, they rotate in the circumferential direction of the pipe, but do not move in longitudinal direction. Especially, the circumscribing rollers rotate in only one direction by the use of the one-way clutch.

A scattering prevention plate is installed on the outside of the vertical fixing plate on the side to which the rectangular link with one open side is coupled to prevent the chips generated during the chamfering from being scattered to the worker.

A moving body is installed in the lower side of the horizontal fixing plate of the present invention such that the inscribing roller is inserted in the lower side of the moving body, a roller shaft of the inscribing roller is installed inside the moving body while it is elastically supported by a spring for the inscribing roller to receive a force to be pushed down by the tension of the spring, and the height of the moving body may be adjusted by an inscribing roller adjustment screw installed on the horizontal fixing plate.

The inscribing roller is adhered to the inside of the pipe; it rotates in the circumferential direction of the pipe, but it does not move in longitudinal direction. Especially, the inscribing roller rotates in only one direction by the use of the one-way clutch.

According to the present invention, the knife-blade between the vertical plate and the support plate chamfers the outside of the cutting surface of the pipe while the inscribing roller is in close contact with the inside of the pipe and the circumscribing rollers are in close contact with the outside of the pipe, and the circumscribing rollers and the inscribing roller rotate in only one direction by the one-way clutches during the chamfering, which makes the chamfered angle precise and the chamfering work simple.

That is, the chamfering apparatus moves by the rotation of the circumscribing rollers and the inscribing roller along the circumferential direction of the pipe in a state where the circumscribing rollers are in close contact with the outside of the pipe and the inscribing roller is in close contact with the inside of the pipe, and the chamfering of the pipe section is performed by the movement of the chamfering apparatus.

The inscribing roller moves up and down in accordance with the rotation of the inscribing roller adjustment screw. When it moves down, it adheres closely to the inner surface of the pipe. If the inscribing roller adjustment screw is rotated even more in this state, the spring is pressed to push the press roller to the steel plate closely. Accordingly, it moves precisely along a circumferential direction of the pipe during the pipe chamfering and perform the chamfering of the cutting surface of the pipe.

In particular, the inscribing roller and the circumscribing rollers rotate in only one direction using the one-way clutches, which removes the concerns over the accidents due to backing.

Now, an embodiment of the present invention will be described in detail with reference to the accompanying drawings.

The chamfering apparatus 10 of the present invention comprises a head 12 for rotating a knife-blade 11 using a rotating force transferred from the motor driving unit, a vertical plate 20 and a support plate 21 coupled to a half-moon shaped angle adjustment plate 22 are installed on the head 12 in orthogonal directions, and a knife-blade 11 projected between the vertical plate 20 and the support plate 21 chamfers a cutting surface of a pipe 50. The configuration of the vertical plate 20 and the support plate 21 fixed to the head 12 and the chamfering feature performed by a rotation of the knife-blade 11 are well known in the art, and thus the detailed description thereof will be omitted.

The vertical plate 20 and the support plate 21 are fixed by the half-moon shaped angle adjustment plate 22 on either side of the head 12, and the knife-blade 11 is projected between the vertical plate 20 and the support plate 21 fixed to make a right angle to chamfer the cutting surface of the pipe 50 inserted between the vertical plate 20 and the support plate 21.

According to the present invention, a vertical fixing plate 30 is fixed to the outside of the vertical plate 20, a horizontal fixing plate 40 is fixed in an orthogonal direction to the vertical fixing plate 30, a rectangular link with one open side 60 is coupled to the outside of the vertical fixing plate 30, the rectangular link with one open side 60 moves up and down according to the rotation of the circumscribing roller adjustment screw 61 protruded over the horizontal fixing plate 40, circumscribing rollers 65 having one-way clutches are installed on tips of the rectangular link with one open side 60, and the circumscribing rollers 65 coupled to the rectangular link with one open side 60 move up and down while they are coupled to the vertical fixing plate 30 in accordance with the rotation of the circumscribing roller adjustment screw 61.

A moving body 70 is coupled under the horizontal fixing plate 40, the moving body 70 moves up and down by the inscribing roller adjustment screw 71 installed over the horizontal fixing plate 40, an inscribing roller 75 having a one-way clutch within is installed under the moving body 70, a roller shaft 76 of the inscribing roller 75 is pressed by a spring 77 such that the moving body 70 descends and adheres to the inside of the pipe 50 by the inscribing roller adjustment screw 71, and the inscribing roller adjustment screw 71 descends even more to press the spring 77 to press the roller shaft 76 in turn, whereby the inscribing roller 75 is maintained to be in close contact with the inside of the pipe 50.

The circumscribing rollers 65 and the inscribing roller 75 have one-way clutches therein to enable them to rotate in only one direction. The one-way clutches embedded in the circumscribing rollers 65 and the inscribing roller 75 are commercially available rollers, and the technique of embedding the one-way clutch in a roller to make it rotatable in only one direction is also well known in the art.

The moving body 70 has the same structure as the moving body disclosed in Korean Patent No. 10-1340571 by the present Applicant, and thus the detailed description thereof will be omitted.

The circumscribing rollers 65 and the inscribing roller 75 rotate while they are in close contact with the outside and inside of the pipe 50, respectively, and they rotate only in the circumferential direction of the pipe 50, but do not move in a direction of the length of the pipe 50.

A scattering prevention plate 15 for shielding the side of the vertical plate 20 is installed on the head 12 to prevent the chips generated through chamfering from being scattered to the worker, the scattering prevention plate 15 is inserted in the rectangular link with one open side 60, the vertical position of the scattering prevention plate 15 can be adjusted along a guide groove in accordance with the change of the pipe diameter, and the screw fixed to the rectangular link with one open side 60 fixes the scattering prevention plate 15 whose vertical position is moved in accordance with the pipe diameter.

In the present invention, both the circumscribing roller adjustment screw 61 and the inscribing roller adjustment screw 71 are installed on the horizontal fixing plate 40. If they have the same height, they overlap the front and rear as viewed from the side of the pipe 50. Accordingly, the height of the circumscribing roller adjustment screw 61 is lower than that of the inscribing roller adjustment screw 71, which allows easy manipulation even if the circumscribing roller adjustment screw 61 and the inscribing roller adjustment screw 71 are placed in line on the side of the pipe 50.

That is, the heights of the adjustment screws-located inside the pipe 50 are different from each other.

The present invention based on the above configuration performs the chamfering of the cutting surface of the pipe 50. First, the circumscribing rollers 65 are placed in the outside of the pipe 50 using the circumscribing roller adjustment screw 61. In this state, the cutting surface of the pipe 50 is inserted between the inscribing roller 75 and the circumscribing rollers 65. Then, the inscribing roller 75 is adhered to the inner surface of the pipe 50 by rotating the inscribing roller adjustment screw 71. Meanwhile, the circumscribing roller 65 is adhered to the outer surface of the pipe 50 by rotating the circumscribing roller adjustment screw 61.

According to the present invention, when viewed from the side in which the cutting surface of the pipe 50 is seen as a circle, the chamfering apparatus 10 is inserted into the cutting surface of the pipe 50 such that two circumscribing rollers 65 have a structure to support either side of the outer surface of the pipe 50 and the inscribing roller 75 has a structure to support the inner surface of the pipe 50 between the circumscribing rollers 65.

That is, after the cutting surface of the pipe 50 is inserted between the circumscribing roller 65 and the inscribing roller 75 such that the circumscribing roller 65 and the inscribing roller 75 may rotate along the circumference of the pipe 50, the circumscribing roller 65 and the inscribing roller 75 are adhered to the inner and outer sides of the pipe 50 using the circumscribing roller adjustment screw 61 and the circumscribing roller adjustment screw 71. Then, the cutting surface of the pipe 50 is in close contact with the vertical plate 20 and the pipe 50 is supported by the circumscribing roller 65 and the inscribing roller 75. If the knife-blade 11 of the chamfering apparatus 10 rotates, the outer edge of the cut surface of the pipe 50 is chamfered. Since the circumscribing rollers 65 and the inscribing roller 75 rotate only in one direction by the one-way clutches, the chamfering apparatus 10 rotates in one direction to rotate along the pipe 50, thereby the work of chamfering the cutting surface for the outer diameter of the pipe 50 is completed.

In this chamfering work, the process of adhering the circumscribing roller 65 to the outside of the pipe 50 will be described.

If the circumscribing roller adjustment screw 61 is rotated, the rectangular link with one open side 60 moves in a vertical direction. Accordingly, the circumscribing rollers 65 move in the vertical direction, and the cut pipe 50 is inserted between the circumscribing rollers 65 and the inscribing roller 75 for the circumscribing rollers 65 to support either outer side of the pipe 50.

If the circumscribing roller adjustment screw 61 is rotated for the circumscribing rollers 65 to support the outside of the pipe 50 such that the rectangular link with one open side 60 moves to the side toward the center of the pipe 50, the circumscribing rollers 65 are in close contact with the outside of the pipe 50.

Further, if the inscribing roller adjustment screw 71 is rotated for the inscribing roller 75 to move in a direction to adhere closely to the inside of the pipe 50, the inscribing roller 75 maintains a state where it is in close contact with the inside of the pipe 50 continuously by the elasticity of the spring 77.

During the chamfering, the circumscribing roller 65 and the inscribing roller 75 should be in close contact with the pipe with a considerable pressure. According to the present invention, the inscribing roller adjustment screw 71 is rotated to descend the moving body 70 in a state where the inscribing roller 75 is in close contact with the pipe 50. If the inscribing roller adjustment screw 71 is continuously rotated after the inscribing roller 75 reaches the inner surface of the pipe 50, the moving body 70 descends more. As the moving body 70 descends, the inscribing roller 75 should also descend. However, it cannot descend because it already reached the pipe 50. Thus, the moving body 70 descends while the inscribing roller 75 is in contact with the pipe 50, which presses the spring 77 to press the roller shaft 76 of the inscribing roller 75. Then, the inscribing roller 75 presses the pipe 50 by the elastic force of the spring 77. Thereby, while the pipe 50 is gripped tightly, the chamfering is normally performed.

That is, if the inscribing roller 75 presses the inner surface of the pipe 50 by pressing the spring 77, then this enables the circumscribing rollers 65 to press the outer surface of the pipe 50. During the chamfering, the circumscribing roller 65 and the inscribing roller 75 move along the circumferential direction of the pipe 50 while they are in close contact with the pipe 50 to perform chamfering.

Since the one-way clutches are included in the circumscribing rollers 65 and the inscribing roller 75, and only rotate in one direction. This enables safe chamfering.

In addition, the present invention uses a scattering prevention plate 15 to prevent the chips generated during chamfering from being scattered to the worker, thereby allowing safe work.

After the chamfering for the cutting surface of the pipe 50 is completed as described above, the rectangular link with one open side 60 is widened in the outside of the pipe using the circumscribing roller adjustment screw 61 to separate the chamfering apparatus 10 from the pipe 50. The chamfering apparatus 10 may then be moved to another pipe 50.

According to the present invention, the circumscribing roller 65 coupled to the rectangular link with one open side 60 supports the outside of the pipe 50 from either side and the inscribing roller 75 supports the inside of the pipe 50. If there is no conspicuous difference in diameters of the pipes 50, only one rectangular link with one open side 60 can be used for several works. Only when there is a large difference in diameters, different rectangular link with one open side 60 having different distance between the two circumscribing rollers 65 is used instead.

According to the present invention, since one rectangular link with one open side 60 may cover various diameters of the pipes, chamfering is performed regardless of the diameter of the pipe 50. Since the chamfering apparatus 10 rotates in only one direction, but does not move in the direction of the length of the pipe 50 during chamfering, the chamfering work becomes safe. Especially, since it may be installed easily and separated after chamfering, it can be used conveniently as a portable pipe chamfering apparatus.

Although the specific embodiments of the present invention have been disclosed for illustrative purposes, those skilled in the art will appreciate that various modifications, additions and substitutions may be made to the invention without departing from the scope and spirit of the invention as disclosed in the accompanying claims.

What is claimed is:

1. A portable pipe outer diameter-chamfering apparatus in which a vertical plate (20) and a support plate (21) are fixed in an orthogonal direction to a head (12) of the apparatus, and the chamfering is performed by a knife-blade (11) installed between the vertical plate (20) and the support plate (21), characterized in that a vertical fixing plate (30) is fixed to the outside of the vertical plate (20), a horizontal fixing plate (40) is fixed in an orthogonal direction to the tip of the vertical fixing plate (30), a rectangular link with one open side (60) is coupled to move upward and downward along the vertical fixing plate (30), a pair of circumscribing rollers (65) which are in close contact with an outside of a pipe (50) are installed on both end portions of the rectangular link with one open side (60), each of the pair of circumscribing rollers (65) being installed on either side, respectively, the rectangular link with one open side (60) moves up and down along the vertical fixing plate (30) by a circumscribing roller adjustment screw (61) installed on the horizontal fixing plate (40), a moving body (70) is installed in the horizontal fixing plate (40), the moving body (70) moves up and down by an inscribing roller adjustment screw (71) installed on the horizontal fixing plate (40), and an inscribing roller (75) which is in close contact with an inside of the pipe (50) and a pressing force of the inscribing roller (75) is adjusted by a spring (77) is installed on the moving body (70).

2. The portable pipe outer diameter-chamfering apparatus of claim 1, wherein the pair of circumscribing rollers (65) are installed to be in close contact with the outer surface of the pipe (50), the inscribing roller (75) is installed to be in close contact with the inner surface of the pipe (50), the inscribing roller (75) is installed to press a central part of the pair of circumscribing rollers (65), and the circumscribing rollers (65) and the inscribing roller (75) are installed to rotate in a circumferential direction only by having one-way clutches which allow rotations in only one direction.

3. The portable pipe outer diameter-chamfering apparatus of claim 1, wherein the moving body (70) is installed in the lower portion of the horizontal fixing plate (40) and moves up and down by the inscribing roller adjustment screw (71) installed on the horizontal fixing plate (40), the inscribing roller (75) which is in close contact with the inner surface of the pipe (50) is installed under the moving body (70), and a roller shaft (76) of the inscribing roller (75) receives an elastic force in a direction adhering to the pipe (50) while coupled to the moving body (70).

4. The portable pipe outer diameter-chamfering apparatus of claim 1, wherein the height of the circumscribing roller adjustment screw (61) installed on the horizontal fixing plate (40) is lower than that of the inscribing roller adjustment screw (71) to allow adjusting of the circumscribing roller adjustment screw (61) without interruption of the inscribing roller adjustment screw (71) on the side of a cut surface of the pipe (50).

* * * * *